J. & L. GOYNON.
HAY COCKER.
APPLICATION FILED AUG. 20, 1908.
966,009.
Patented Aug. 2, 1910.
2 SHEETS—SHEET 2.
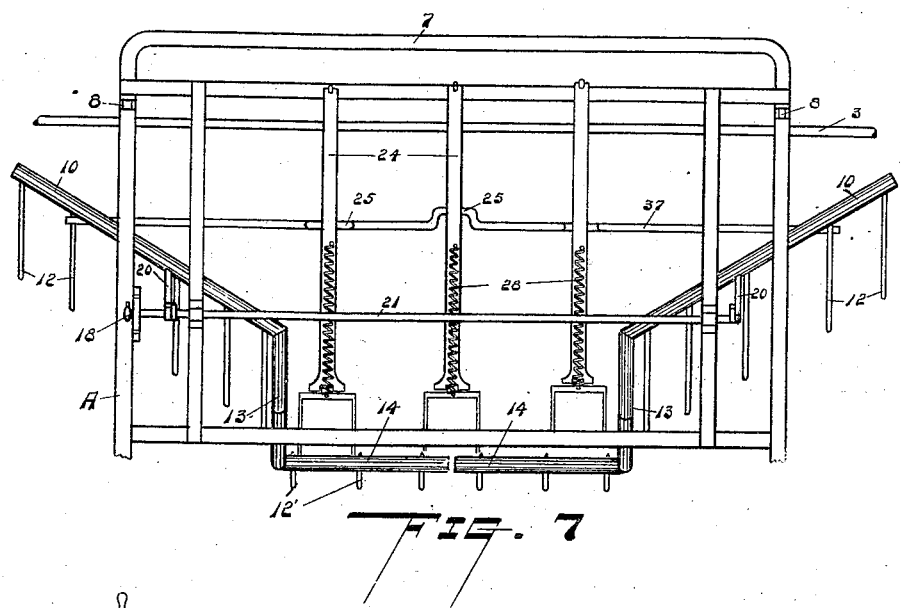
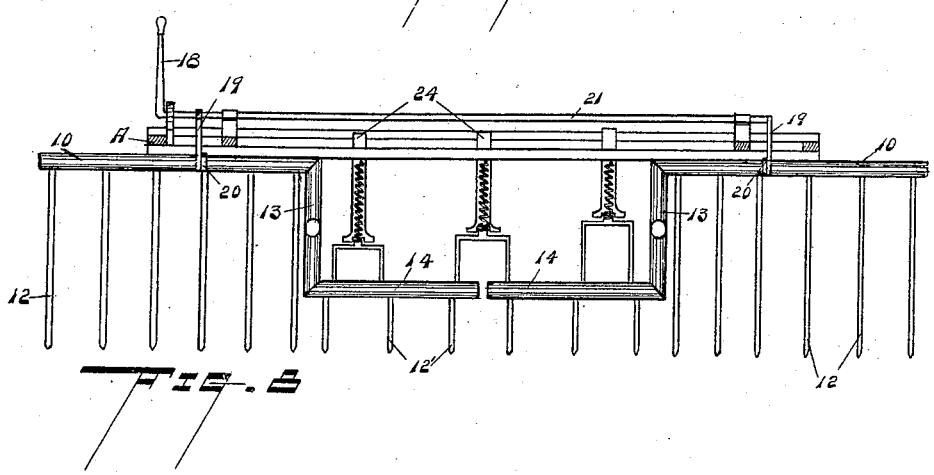
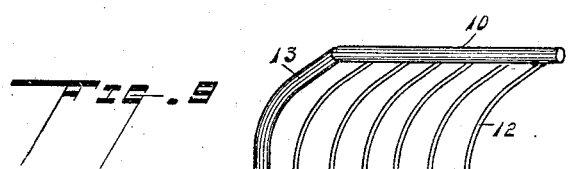
WITNESSES:
Roy Wallis
Ralph S. Warfield
INVENTORS
James Goynon and
Louis Goynon
BY
Geo. B. Willcox
ATTORNEY

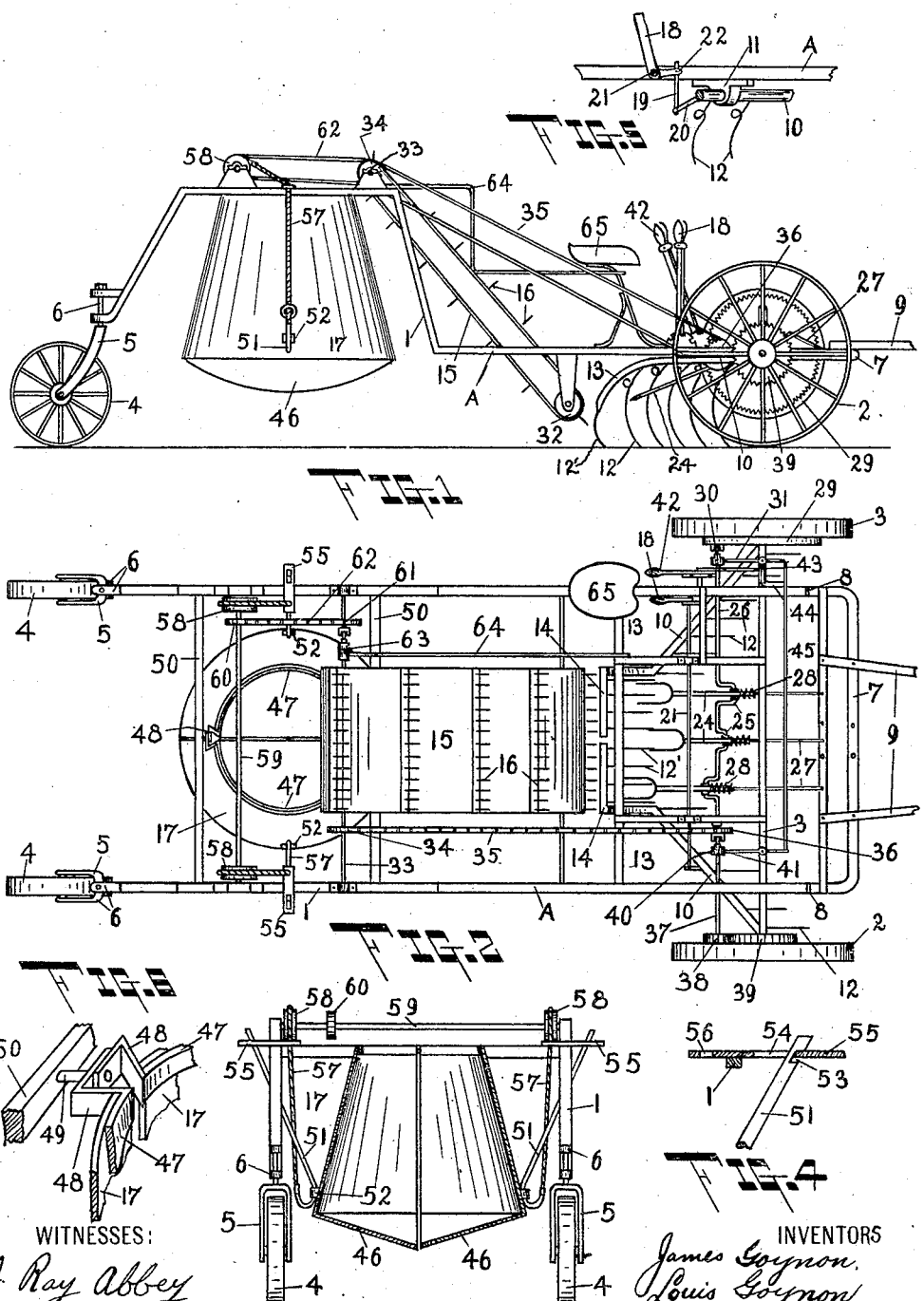

UNITED STATES PATENT OFFICE.

JAMES GOYNON AND LOUIS GOYNON, OF BAY CITY, MICHIGAN.

HAY-COCKER.

966,009.  Specification of Letters Patent.  Patented Aug. 2, 1910.

Application filed August 20, 1908. Serial No. 449,495.

*To all whom it may concern:*

Be it known that we, JAMES GOYNON and LOUIS GOYNON, citizens of the United States, residing at Bay City, in the county of Bay and State of Michigan, have invented certain new and useful Improvements in Hay-Cockers; and we do hereby declare the following to be a full, clear, and exact description of the invention, such as will enable others skilled in the art to which it appertains to make and use the same.

Our invention relates to hay cockers.

One object is to provide a device of this nature wherein it is unnecessary to reverse the hay receiving receptacle end for end in discharging the contents thereof, or to stop the machine while discharging the contents.

Another object is the provision of means for quickly dumping or discharging the contents of the hay receiving receptacle while the machine is in motion to prevent the hay collected from being strewn in a windrow.

A further object is the provision of improved means for gathering or raking the hay and leading it to the receiving receptacle.

To these and other ends our invention consists of certain novel features and combinations such as will be more fully described hereinafter and particularly pointed out in the claims.

In the accompanying drawings, Figure 1 is a side view of our invention, Fig. 2, a top plan view, Fig. 3, a rear view partly in section, Fig. 4, a detail view showing the catch for retaining the hopper closed, Fig. 5 is a detail of the means for raising and lowering the rakes, Fig. 6 is a detail view of the means for pivotally supporting the hopper. Fig. 7 is a top plan view, Fig. 8 is a front view, and Fig. 9 is a detail view of the rake.

A indicates the braced frame of our machine, the rear portion of the frame being elevated as at 1 to form a bridge whereby to support the hopper a suitable distance above the ground. This frame is supported by the front wheels 2, 2 rotatably mounted on the stationary front axle 3, and by the rear wheels 4 held in the forks 5, 5 which are swiveled to the rear portion of the frame as at 6. A suitably braced U-shaped member 7 is hinged as at 8 to the forward end of the frame. Thills 9 are adjustably secured to the U-shaped member to permit one horse or a team to be hitched up.

In order to collect or gather the hay, we provide a pair of rakes comprising the converging bars 10, 10 journaled to the underface of the frame as shown at 11 in Fig. 5, such bars having secured thereto the rake teeth 12. The adjacent rear ends of the bars are first curved downwardly as at 13 and then horizontally inwardly toward each other as at 14, whereby the sections 14 are brought near the ground. As the machine traverses the field the hay will be gathered by the rakes and shunted or directed toward the center of the machine where the rakes are reduced in height. Directly behind the low rear sections of the rake is located the lower end of an endless conveyer 15. Such conveyer may be of any suitable style, but we prefer to use a belt conveyer equipped with successive rows of teeth 16. This conveyer leads from a point directly behind the adjacent low rear ends of the rakes to a point on the bridge 1 above the open end of the hopper. As one means for raising and lowering the rakes, we provide the lever 18 secured to a shaft 21 journaled in and extending across the frame, such shaft having secured thereto two arms 22, connected by links 19 to arms 20 rigidly secured to and projective from the respective rake bars. This construction is shown in detail in Fig. 5.

In order to transfer the hay from the ground to the conveyer, we lower the adjacent rear ends of the rakes as heretofore described and impart an easy curve to the rake teeth 12' carried by the sections 14 to permit the bunched hay, straw or what not to ride up the rake teeth and fall on to the conveyer. To assist this process, however, we provide kickers, consisting of a series of forks 24 the stems of which are mounted on the cranks 25 projecting radially at different angles to each other on the crank shaft 26 journaled to and extending across the frame. The upper ends of the stems may be pivotally connected to the thill frame 7 by the links 27, whereby when the thill frame and thills are dropped, the kickers are raised up out of the way. The stems are also provided with the usual springs 28. As a means for rotating the shaft 26 we provide the ring gear 29 carried preferably by one of the front wheels 2. A spur gear (not shown) meshes with the teeth of the gear 29, a clutch mechanism 30 controlled by a shifting lever 31 pivoted, it may be, on the front axle being interposed between the spur wheel and the shaft 26, whereby to cause the shaft to rotate or permit it to remain idle.

The belt conveyer 15 is supported on rolls 32, the upper one of which is mounted on a shaft 33, journaled on the bridge 1 and carrying a sprocket 34. A chain 35 connects sprocket 34 with a sprocket 36 mounted on a shaft 37 journaled in the frame and provided with a spur gear 38 meshing with a drive gear 39 carried by the remaining front wheel 2. A clutch mechanism 40 on the shaft 37 actuated by a shifting lever 41 pivoted, for instance, on the axle 3 controls the operation of the belt conveyer.

It will be noted that shaft 37 rotates in a direction opposite to that in which shaft 26 rotates, and in order to control the operation of the conveyer and of the kickers through a single means, we provide a lever 42 connected by a link 43 to one arm of a pivotally supported bell crank 44, the opposite arm of which bell crank is secured to a connecting link 45 extending between the free ends of the respective shifting levers 31 and 41. Movement of the lever 42 in one direction or the other will throw both clutches in or out, respectively.

In order to drop the hay in cocks we provide the following mechanism. Suspended beneath the elevated portion 1 of the frame is a hopper 17 generally frusto-conical in shape, and comprising two semi-frusto-conical members independent of each other, such members being semi-circular at their upper ends and having downwardly inclined or sloping bottoms 46 which coöperate to close the lower end of the hopper when the members are in their vertical positions. The semi-circular upper ends of the members are secured in any suitable manner to semi-annular bars 47 offset at their opposite ends as at 48, the offsets on one bar adapted to overlap the offsets of the opposite bar, the two semi-annular bars coöperating to form a horizontally disposed ring having offset portions at diametrically opposite points. Pivot pins 49 pass through these opposite overlapped offsets, whereby the two members forming the hopper are arranged to swing outward away from each other and laterally relative to the travel of the machine. The pivot pins are supported in the cross braces 50, 50 of the elevated part 1 of the frame. The offsets are formed to give clearance to the semi-conical members as they swing toward and from each other and relative to the cross braces 50. As one means for mechanically actuating the members of the hopper 17, we provide the hooks 51 loosely connected by the straps 52 to the semi-conical members near their lower ends. The shanks of the hooks are notched as at 53 (see Fig. 4) and pass loosely through slots 54 formed in the respective projecting ears 55 secured to the longitudinally extending bars of the elevated portion of the frame. The rear ends of said ears are apertured as at 56. Cables 57 pass through the apertures and are secured at their lower ends to the hooks 51. The opposite ends of the cables are wound on the drums 58 mounted near the opposite ends of a counter-shaft 59 journaled near the rear end of the elevated portion above the hopper 17, such shaft being provided with a sprocket 60 connected by a chain 62 to a second sprocket 61 on the upper roll shaft 33. A clutch mechanism 63 on the roll shaft coöperates with the sprocket 61, the clutch being operated by a lever 64 extending forwardly to the driver's seat 65 near which are also located the levers 18 and 42.

The operation of the rakes, kickers and conveyer has been heretofore described.

When the conveyer has deposited a sufficient amount of hay in the hopper, which is larger at the bottom than at the top, the driver will actuate lever 64 to throw in clutch 63 and thereby impart motion to the counter-shaft 59 to wind the cables 57 thereon. The lower ends of the cables being secured to the offset ends of the hooks which hooks lie some distance laterally of the vertical plane of the pivot pins 49, will operate to swing the hopper sections away from each other to dump the load in a cock or pile, the movement of the sections away from each other being rapid and the sloping bottoms 46 facilitating the discharge of the hopper contents. The notches in the shanks of the hooks 51 take over the edges of the slots in the ears 55 and operate to lock the hopper sections in closed position. Therefore, before the sections can be swung open, it is necessary to release the shanks from the ears. This is accomplished by the upward pull of the cables on the free lower ends of the hooks which operates to swing the hooks inwardly by reason of their loose connection through straps 52 with the hopper sections, and as the sections move upwardly, the shanks of the hooks slide in the slots 54. As soon as the hopper has discharged its load, the clutch 63 is thrown out whereupon the hopper sections return to their closed positions by gravity, unwinding the cables, and the notches in the hooks automatically take over the edges of the slots 54 to lock the hopper sections in position again. It takes but a small space of time to discharge the contents of the hopper and return the sections to closed position. The countershaft 59 is set back from the upper open end of the hopper so as not to impede the delivery of the hay thereinto.

From the foregoing, it is plain that we have devised an efficient machine for raking the hay or other material and leaving it in cocks or piles. We have also devised a hay cocker, the hopper of which is not rotated which would place unnecessary strain on the machine and necessitate a stoppage of the rake until the hopper is reversed and dumped. In some instances, indeed, it is necessary in former machines for the driver to get off his seat and go to the rear of the machine in order to properly dump the hopper.

It is evident that changes might be made in the form and arrangement of the several parts described without departing from the spirit and scope of our invention.

Having thus fully described our invention, what we claim as new, is:—

1. A hay cocker comprising a frame, converging rakes carried by the frame, a conveyer, one end of which is located at the converging point of the rakes, kickers for throwing the material gathered by the rakes onto the conveyer, a section hopper into which the conveyer discharges, the hopper sections being pivoted at their upper ends and adapted to swing from each other to deliver the contents of the hopper in a pile.

2. A hay cocker comprising a frame, converging rakes carried by the frame, a conveyer, one end of which is located at the converging point of the rakes, a sectional hopper into which the conveyer discharges, the hopper sections being pivoted at their upper ends and adapted to swing from each other to deliver the contents of the hopper in a pile.

3. A hay cocker comprising a frame, means for gathering material and shunting it to a common point, a conveyer for receiving the material, and a sectional hopper, the material being discharged by the conveyer into the upper open end of the hopper, the hopper sections being pivoted near their upper ends to swing from each other to deposit the contents of the hopper.

4. A hay cocker comprising a pair of rearwardly converging rakes, the rear ends of which are reduced in height and coöperate to form a pocket into which the hay gathered by the rakes is shunted, inclined teeth carried by the rear ends of the rakes, kickers for assisting the hay in its progress over the rear ends of the rakes, a conveyer onto which the material falls, a sectional non-reversible hopper for receiving the material, and means for separating the hopper sections.

5. A hay cocker comprising a frame, a pair of independent converging rakes respectively journaled to the frame, a shaft extending across the frame, a lever secured to the shaft, arms projecting from the shaft, other arms projecting from the rakes, means for pivotally connecting the arms on the shaft with the respective arms on the rakes to permit both rakes to be simultaneously raised or lowered, a conveyer onto which the material falls, a sectional non-reversible hopper for receiving the material, and means for separating the hopper sections.

6. A hay cocker comprising a frame, a pair of converging rakes, a conveyer, one end of which is located adjacent the point to which the rakes converge, kickers for assisting material over the rakes onto the conveyer, a shaft for actuating the kickers, a second shaft for actuating the conveyer, means for rotating the shafts in opposite directions, clutch mechanisms on the respective shafts, shifting levers for operating the clutch mechanisms, a connecting rod between the shifting levers, a bell crank for reciprocating the connecting rod, a lever, and a link connecting the lever and bell crank for controlling the two clutch mechanisms simultaneously, a conveyer onto which the material falls, a sectional non-reversible hopper for receiving the material, and means for separating the hopper sections.

7. A hay cocker comprising a gathering means, a conveyer onto which the material is automatically fed, a receiving hopper to which the conveyer delivers the material, the hopper comprising a non-reversible frusto-conical member vertically divided to form a pair of semi-frusto-conical sections, the sections being pivotally supported at their adjacent upper ends, sloping bottoms carried by the wider lower ends of the sections to close the lower end of the hopper, and means for swinging the sections apart to discharge the contents of the hopper.

8. A hay cocker comprising a gathering means, a conveyer to which the material is automatically fed, a non-reversible hopper larger at the bottom than at the top, to which hopper the material is delivered by the conveyer, the hopper consisting of a plurality of sections, a bottom on each section, the adjacent upper ends of the sections being pivotally supported, and means for swinging the sections away from each other at the bottom, to discharge the contents of the hopper.

9. In a hay cocker, a hopper comprising a pair of semi-frusto-conical sections, bottoms secured to the lower larger ends of the sections, a pair of semiannular bars disposed horizontally, offsets at the opposite ends of each bar, the offsets overlapping, and pins passing through the overlapped offsets to pivotally support the sections and permit them to swing away from each other to discharge the hopper contents.

10. A hay cocker comprising a frame, means for gathering and concentrating the material, a conveyer to which the material is automatically fed, a hopper to which the material is delivered, the hopper comprising a plurality of vertically disposed sections pivotally supported near their upper adjacent ends and adapted to swing toward and from each other, a plurality of rotatable drums on the frame, and means connecting the drums with the respective free ends of the sections.

11. In a hay cocker, a hopper comprising a plurality of vertically disposed sections pivotally supported near their upper ends and adapted to swing toward and from each other, a plurality of rotatable drums, a hook loosely secured near the free end of each section, the shanks of the hooks being notched; suitably supported slotted ears through which the shanks pass, the edges of the respective slots being engaged by the notches to lock the sections in closed position, and cables secured to the remaining free ends of the hooks, and wound around the drums.

12. In a hay cocker, a hopper comprising a plurality of sections, one of which is capable of movement in the arc of a circle relative to the other, a locking member loosely secured near the free end of the movable section, a suitably supported catch engaged by the locking member to hold the sections closed, and a flexible winding means connected to the locking member to release it from the catch and raise the movable section.

In testimony whereof, we affix our signatures in presence of two witnesses.

JAMES GOYNON.
LOUIS GOYNON.

Witnesses:
WILLIAM CREELY,
ELBERT V. INGERSOLL.